July 8, 1952 J. B. COLE 2,602,614
AIRCRAFT CONSTRUCTION
Filed June 7, 1948 2 SHEETS—SHEET 1
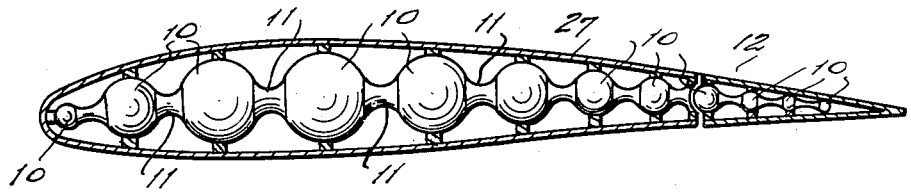
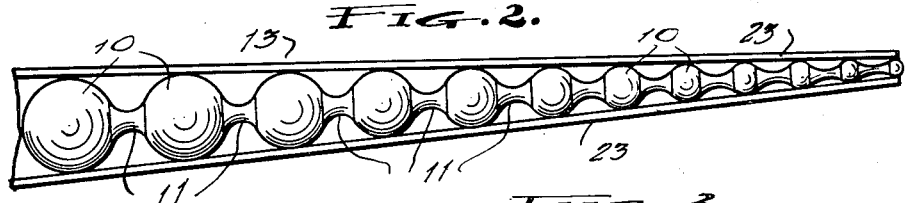
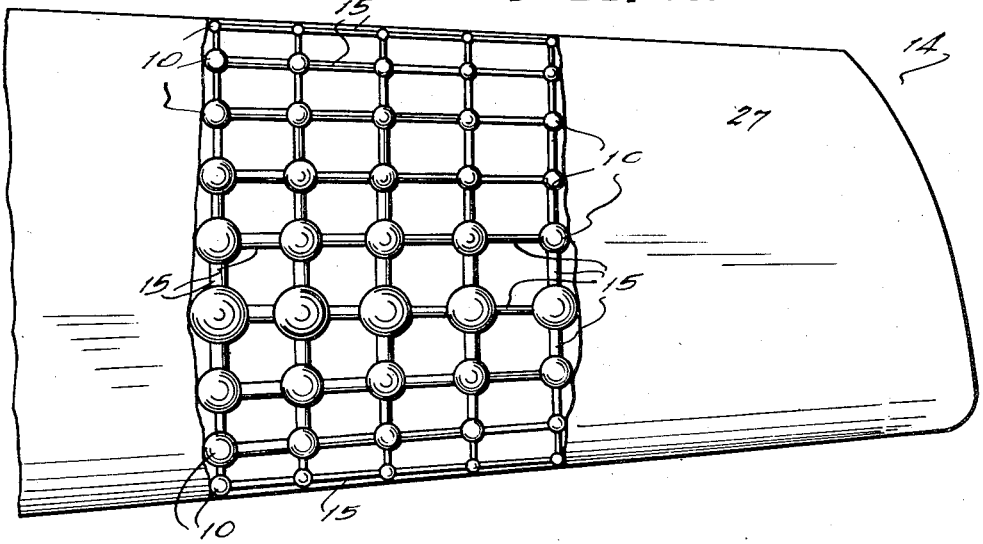
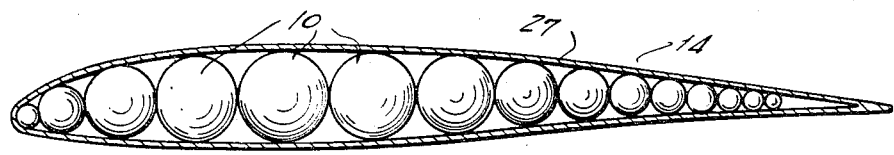
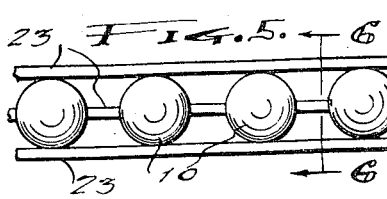
JOSEPH B. COLE
INVENTOR.
BY Cecil L. Wood
ATTORNEY July 8, 1952 J. B. COLE 2,602,614
AIRCRAFT CONSTRUCTION
Filed June 7, 1948 2 SHEETS—SHEET 2
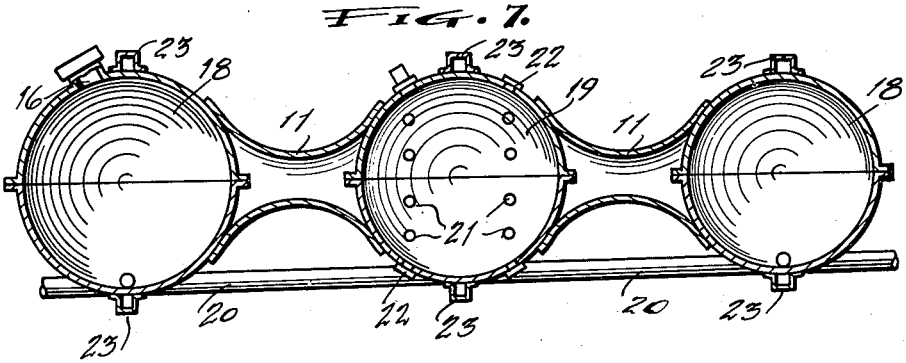
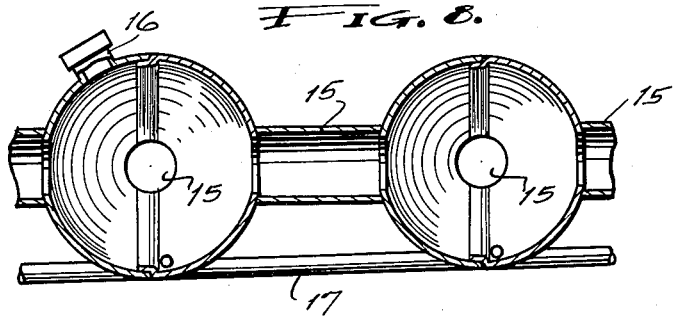
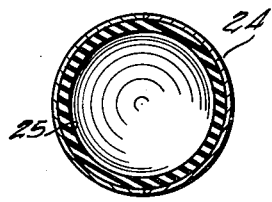
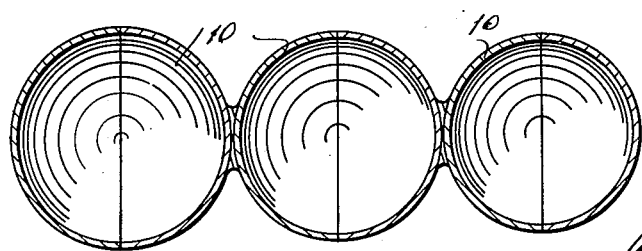
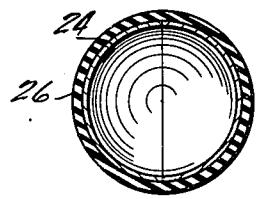
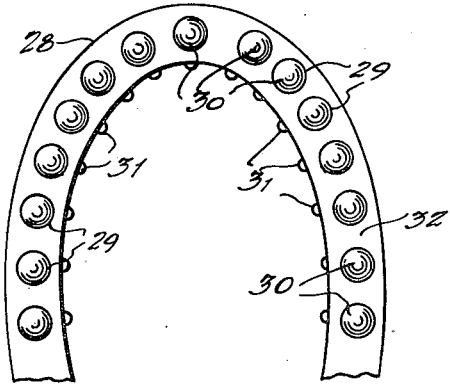
JOSEPH B. COLE
INVENTOR.
BY Cecil L. Wood
ATTORNEY Patented July 8, 1952

2,602,614

UNITED STATES PATENT OFFICE 2,602,614

AIRCRAFT CONSTRUCTION

Joseph B. Cole, Gainesville, Tex., assignor of fifty-one per cent to E. T. Bridges, Gainesville, Tex.

Application June 7, 1948, Serial No. 31,557

3 Claims. (Cl. 244—123)

This invention relates to aircraft construction, and it has particular reference to unique design in the internal structures of wings, longerons, ailerons, and other control surfaces of the craft, and its principal object resides in the provision of a structural arrangement employing spherical supports for compressible surfaces calculated to lighten the craft while affording greater strength at points where pressures are applied in the operation of the craft.

An object of the invention is that of providing a structural design in which is embodied a unique arrangement of hollow spheres suitably spaced, and of diameters capable of withstanding high pressure loads, and affording containers for fuel, fire extinguishing fluids, such as carbontetrochloride, or the like, as well as helium gas, oxygen, hydraulic fluids, and other elements, enlarging the storage or carrying capacity of the craft.

Another object of the invention resides in the provision of a structure which will aid in producing buoyancy for the craft by the use of such lighter-than-air elements as helium gas, or a similar product, and provide accommodation for the carrying of oxygen in stratospheric operation.

Broadly, the invention contemplates the provision of aircraft construction affording a more rigid assembly by an arrangement in which greater stress bearing surfaces are provided, insuring greater safety in operation and, by reason of the hollow spherical units, affording many other advantages, such as extra storage for fluids, including fuel, gases, and fire extinguishing compounds.

While the foregoing objects are paramount, other and lesser objects will become manifest as the description proceeds, taken in connection with the appended drawings wherein:

Figure 1 is a transverse sectional view through a wing or aileron embodying an arrangement of spherical units in accordance with the invention.

Figure 2 fragmentarily illustrates, in side elevation, a spar or longeron construction employing the spherical unit forming a part of the invention.

Figure 3 is a fragmentary plan view of a wing structure, a portion of which is cut away, illustrating the invention.

Figure 4 is a transverse cross-sectional illustration through a wing showing a row of varying size spheres arranged between the top and bottom wing coverings.

Figure 5 fragmentarily illustrates another spar or longeron construction in which a series of the spheres are shown coupled by longitudinal bars.

Figure 6 is a transverse sectional view of the structure shown in Figure 5, taken on lines 6—6 of Figure 5.

Figure 7 illustrates a section of the spherical elements, shown in vertical section, adapted as containers for fuel, fire extinguishing fluids, and the like.

Figure 8 illustrates, in vertical section, another arrangement of the spherical members coupled by connecting conduits providing for fuel storage.

Figure 9 is still another illustration showing an arrangement of the spherical units in vertical section.

Figure 10 is a vertical cross-sectional illustration of a spherical unit having a rubber or composition lining.

Figure 11 shows one of the spherical units, in vertical section, having a rubber or composition covering.

Figure 12 is a fragmentary elevational view of a bulkhead construction having an arrangement of hollow rubber or composition spheres in the otherwise open structure, and Figure 13 is a fragmentary cross-sectional view through one of the rubber spheres employed in the bulkhead structure shown in Figure 12.

In conventional aircraft construction, the ribs, or cross-member structure of the wings, ailerons, and the like, are generally of metal and formed with apertures of varying diameters designed to produce strength while affording a light structure, and these ribs, or cross-members are usually of some light material such as aluminum or magnesium. The resultant structure is light, though durable, but does not possess the durability and strength, capable of resisting great compressibility on control surfaces of the craft, that spherical units can afford when employed in arrangements taught by the invention.

Moreover, an advantage is gained, in the use of these spherical members, aside from the strenthening factors, of fluid retaining storage space vitally necessary in accommodating extra fuel supply, oxygen, and the like, or by minimizing fire hazards by supplying storage for the transportation of fire extinguishing fluids adapted to be released to extinguish fires induced in crash landings, and even in normal flight when some impairment of the mechanism occurs which will present a fire hazard.

The invention contemplates an arrangement of construction in which may be embodied any combination of hollow spherical or globular members 10, such as those illustrated in Figures 1, 2 and 7, which can be coupled by hollow connections 11, preferably swaged as shown in Figures 1 and 7, and integrally secured to the members 10 as by spot welding, or the like. The spherical units 10, as well as the couplings 11, should be of such dimensions as would properly conform to the contour or dimensional thickness of any chord section through an aileron 12, a longeron 13, or wing 14, as illustrated in Figures 1, 2 or 3, respectively.

In other exemplifications of the invention the spherical members 10 are joined by tubular couplings 15, as in Figures 3 and 8, which may or may not provide internal communication between the members 10. Thus, as in the structure shown in Figure 8, the spherical members 10 can be employed as fuel storage, a capped filler opening 16 being arranged on one or more of the members and a fuel line 17 arranged between them to conduct the fluid to the craft's engine. The tubular conduits or couplings 15 produce a common connection between the several spheres 10 and render the entire assembly a common storage reservoir.

In Figure 7 is illustrated, in vertical section, an arrangement in which the hollow spherical members 18 are interspersed by spheres 19 which do not have communication with the spheres 18, although a line 20 connects the spheres 18 with each other. It is contemplated that the members 19 have perforations 21 therein in which soft thermal plugs 22 can be placed so that a fire extinguishing fluid, such as carbon-tetrachloride, may be carried in the spheres 19 and be dischargeable therefrom in the event the craft is hazarded by fire.

The spherical members 18 and 19 are preferably arranged in a manner such as that illustrated in Figures 1, 2 and 3, but the assembled and connected units of spheres, forming ribs at this stage, are tied transversely by such means as channel strips 23, shown in cross-section in Figures 5, 6, and 7. It is expedient, in the manufacture of the spheres 10, 18 and 19, as well as the members 24 illustrated in Figures 10 and 11, in semi-spherical sections to be welded or otherwise secured to form a fluid-tight globe.

Obviously, the spheres 10, or even the spheres 18 and 19, may be connected on all sides, as by welding, or the like. Such an arrangement is illustrated in Figures 4 and 9. The spacing of the spheres depends upon the particular stress or strain requirements.

A lining 25 of rubber, or other composition, may be employed, if desired, to protect the contents of the spheres against leakage in the event of puncture as by bullets, or the like. It is contemplated that the lining 25 be of a material which would provide for self-sealing such punctures. An exterior cover 26, also of rubber, or similar material suitable for insulation, may also be utilized to reduce the possible action of static electricity upon the ship and the contents of the members 10, 18 and 19.

When the spheres are assembled in axial alignment to form ribs for the wing structure, as in Figures 1, 3 or 4, the wing cover or skin 27 is applied and secured by any suitable means as by rivets, or the like. Any refinement structure as may be suitable can be employed for forming out the leading or trailing edges of the wings, or other such elements in which the invention is employed.

In bulkhead construction it is common practice to employ U-shaped frame structures 28, shown fragmentarily in Figures 12 and 13, which have apertures 29 arranged therearound to lighten the assembly. The invention contemplates the use of hollow rubber balls 30 which can be conformably installed in each aperture 29 and secured by a bolt or pin 31. The purpose of the balls 30 is that of providing a cushion between the plates 32 forming the structures 28 and also to reduce the effects of static electricity therebetween.

Manifestly, the invention may be modified from time to time, by persons skilled in the art, without departing from the spirit and intent thereof or the scope of the appended claims.

What is claimed is:

1. In a structural frame-work for aircraft wings and ailerons, in combination with the coverings for said elements, a plurality of aligned and rigidly connected rigid hollow spherical members of varying diameters, graduating to lesser diameters forwardly and rearwardly from the axial line of said elements to conform to the surface contours of said elements, and means embodied in certain of said spherical members adapting the same to contain fuel for said craft.

2. In a wing and aileron construction for aircraft, in combination with the covering for said elements, a frame comprising a plurality of rigidly associated hollow spherical members, the said members graduating in diameters forwardly and rearwardly of said frame from the longitudinal axis thereof conformable to the transverse sectional form of said elements and providing a supporting base for said covering, and means embodied in certain of said spherical members adapting the same for containing fluids.

3. In a structural frame-work for aircraft wings and ailerons, in combination with the covering for said elements, a rigid frame structure comprising a plurality of uniformly aligned hollow spherical members, the said members being rigidly associated by couplings therebetween and having different diameters graduating forwardly and rearwardly of said frame structure and being substantially uniform in diameters in alignment centrally and longitudinally of said frame, and means for adapting certain of said spherical members to contain fuel fluids.

JOSEPH B. COLE.

REFERENCES CITED

The following references are of record in the file of this patent:

UNITED STATES PATENTS

| Number | Name | Date |
|---|---|---|
| 1,704,612 | Johnson | Mar. 5, 1929 |
| 1,766,906 | James | June 24, 1930 |
| 1,766,914 | Lemieux | June 24, 1930 |
| 1,795,970 | Rohrbach | Mar. 10, 1931 |
| 2,382,817 | Reiss | Aug. 14, 1945 |